(12) United States Patent
Tan

(10) Patent No.: US 9,730,432 B2
(45) Date of Patent: Aug. 15, 2017

(54) MULTI-STAGE RATIONED FEEDER FOR ORNAMENTAL FISH

(71) Applicant: SHENZHEN XINGRISHENG INDUSTRIAL CO., LTD., Shenzhen, Guangdong Province (CN)

(72) Inventor: Guanyu Tan, Shenzhen (CN)

(73) Assignee: SHENZHEN XINGRISHENG INDUSTRIAL CO., LTD. (CN)

( * ) Notice: Subject to any disclaimer, the term of this patent is extended or adjusted under 35 U.S.C. 154(b) by 192 days.

(21) Appl. No.: 14/765,331

(22) PCT Filed: Sep. 18, 2013

(86) PCT No.: PCT/CN2013/083843
§ 371 (c)(1),
(2) Date: Aug. 1, 2015

(87) PCT Pub. No.: WO2015/039319
PCT Pub. Date: Mar. 26, 2015

(65) Prior Publication Data
US 2015/0366171 A1    Dec. 24, 2015

(51) Int. Cl.
*A01K 61/02* (2006.01)
*A01K 61/80* (2017.01)
*A01K 61/10* (2017.01)
*A01K 61/00* (2017.01)
*G01F 11/24* (2006.01)
*A01K 61/85* (2017.01)

(52) U.S. Cl.
CPC ............ *A01K 61/025* (2013.01); *A01K 61/00* (2013.01); *A01K 61/10* (2017.01); *A01K 61/80* (2017.01); *A01K 61/85* (2017.01); *G01F 11/24* (2013.01)

(58) Field of Classification Search
CPC ........ A01K 61/00; A01K 61/10; A01K 61/80; A01K 61/85
USPC ............................................ 119/51.04, 57.91
See application file for complete search history.

(56) References Cited

U.S. PATENT DOCUMENTS

| | | | | |
|---|---|---|---|---|
| 3,677,230 A | * | 7/1972 | Braden ................. | A01K 61/80 119/51.04 |
| 4,270,489 A | * | 6/1981 | Joronen ................ | A01K 61/85 119/51.04 |
| 4,628,864 A | * | 12/1986 | Smeltzer ............... | A01K 61/80 119/51.04 |
| 5,138,979 A | * | 8/1992 | Baird .................... | A01K 61/80 119/51.04 |

(Continued)

Primary Examiner — David Parsley
(74) Attorney, Agent, or Firm — PROI Intellectual Property US

(57) ABSTRACT

A multi-stage rationed feeder for ornamental fish, comprising a container, a container cover assembly and a measuring cup assembly. A falling-material receiving cover of the container cover assembly is adapted to a container cover, and a buckle position is buckled into a container cover snapping slot, such that the falling-material receiving cover is rotatably mounted and connected to the container cover. The measuring cup assembly comprises a measuring cup and a blocking slice. One end of the blocking slice is provided with a sleeve hole for sheathing a blocking slice pin. A pin groove is adapted to a falling-material receiving cover pin snapped into the pin groove such that the measuring cup assembly is removably mounted and connected to the container cover assembly from below.

6 Claims, 9 Drawing Sheets

(56) References Cited

U.S. PATENT DOCUMENTS

| | | | | |
|---|---|---|---|---|
| 5,154,547 | A | * | 10/1992 | Young .................... A01K 61/80 119/51.04 |
| 6,779,485 | B2 | * | 8/2004 | Bresolin ................ A01K 61/85 119/210 |
| 7,174,849 | B1 | * | 2/2007 | Hall ....................... A01K 61/85 119/51.04 |
| 2011/0067634 | A1 | * | 3/2011 | Rossin ................... A01K 61/85 119/51.04 |

* cited by examiner

MULTI-STAGE RATIONED FEEDER FOR ORNAMENTAL FISH

CROSS REFERENCE TO RELATED APPLICATIONS

The present application is the US national stage of International Patent Application PCT/CN2013/083843 filed on Sep. 18, 2013.

TECHNICAL FIELD

The invention relates to a fish feeding device, especially relates to hand control components controlling the feed delivery amount, particularly relates to a multi-stage rationed feeder for ornamental fish.

BACKGROUND ART

To breed ornamental fish, feed is required to be delivered to the fish tank everyday, and the amount of feed to be delivered is crucially important to the survival and health of the ornamental fish. The rationed aquarium feed delivery device with prior art is complex in structure, in need of electric energy and inconvenient to use; it is not suitable for common families as well.

CONTENT OF THE INVENTION

The technical problem the invention aims to settle lies in avoiding the said deficiencies of the prior art so as to provide a multi-stage rationed feeder for ornamental fish, which is simple in structure, energy saving and environment friendly, and convenient to use.

The technical solution adopted by the invention to resolve the problem shall be: a multi-stage rationed feeder for ornamental fish, comprising a container, a container cover assembly and a measuring cup assembly assembled in order from top to bottom; the container is provided with an accommodating cavity for storing feed, and a first connection structure is provided at a periphery of the a mouth of the container.

The container cover assembly comprises a container cover and a falling-material receiving cover, wherein the container cover is provided with a second connection structure at an upper part periphery thereof, a material discharge hole at a lower part thereof, and a buckle bit slot at a lower-part outer cylindrical surface thereof, wherein a falling-material receiving hole is provided at a bottom surface of the falling-material receiving cover, a falling-material receiving cover pin is provided at the peripheral outside lateral of the falling-material receiving cover, and a buckling position is provided at the peripheral internal face of the falling-material receiving cover; wherein the falling-material receiving cover is adapted to the container cover, and the falling-material receiving cover buckling position is buckled into the container cover buckle bit slot, such that the falling-material receiving cover is rotatably mounted and connected to the container cover; wherein the second connection structure is adapted to the first connection structure, such that the container cover assembly is fixedly connected to the container from below.

The said measuring cup assembly comprises a measuring cup and blocking slice, wherein an axial blocking slice pin is provided at the bottom center of the measuring cup, axial tooth slots are provided on the peripheral inner face of the measuring cup, a pin groove is provided on the outer edge of the measuring cup, and a separating plate is radially arranged with respect to the central axis; wherein one end of the blocking slice is provided with a sleeve hole for sheathing the blocking slice pin, such that a quantitative loading zone is formed between the blocking slice and the separating plate; wherein the pin groove is adapted to the falling-material receiving cover pin, and the falling-material receiving cover pin is clamped into the pin groove such that the measuring cup assembly is removably mounted and connected to the container cover assembly from below;

When the measuring cup assembly is turned right to the end, the falling-material receiving cover is driven to turn, thus the falling-material receiving hole is aligned with the material discharging hole, and the feed falls into the measuring cup, then, when the measuring cup assembly is turned in the opposite direction to the end, the falling-material receiving cover is made turn back to close the falling-material receiving hole, then, remove the measuring cup assembly to feed the ornamental fish.

Further, the container cover assembly further comprises a torsional spring; a lower part of the container cover is arranged with two axial torsional spring clamping posts; a bottom of the falling-material receiving cover can be arranged with an axial torsional spring sleeve post; the torsional spring sheathes the torsional spring sleeve post and is clamped between the two torsional spring clamping posts, such that while the multi-stage rationed feeder is not feeding food, the azimuth bearing of the falling-material receiving cover is automatically located at where the material discharge hole is closed in the container cover assembly.

The first connection structure and the second connection structure are mutually adaptive threaded connection structure.

The upper periphery of the container cover is provided with a second connection structure, which can be located at the upper periphery inner wall of the container cover, while a first connection structure is located at the outside periphery lateral of the mouth of the container.

The outer edge of the measuring cup is arranged with a pin groove shaped like a capital letter L.

Bottom of the measuring cup can be inward convex conic shaped, such that the feed is easier to be spread to the surrounding and flow without being blocked, and the ration is accurate.

During the actual operation, the blocking slice can be pulled up and turned as different rations, the end part of the blocking slice can be inserted into different tooth slots, so as to get different capacities in the quantitative loading zone, forming multi-stage rations, the outside surface of the measuring cup can be engraved with capacities corresponding to each tooth slot, so as to operate more conveniently.

Compared with the prior art, beneficial effects of the invention are: simple in structure, energy saving and environment friendly and convenient to use.

Figure 1:
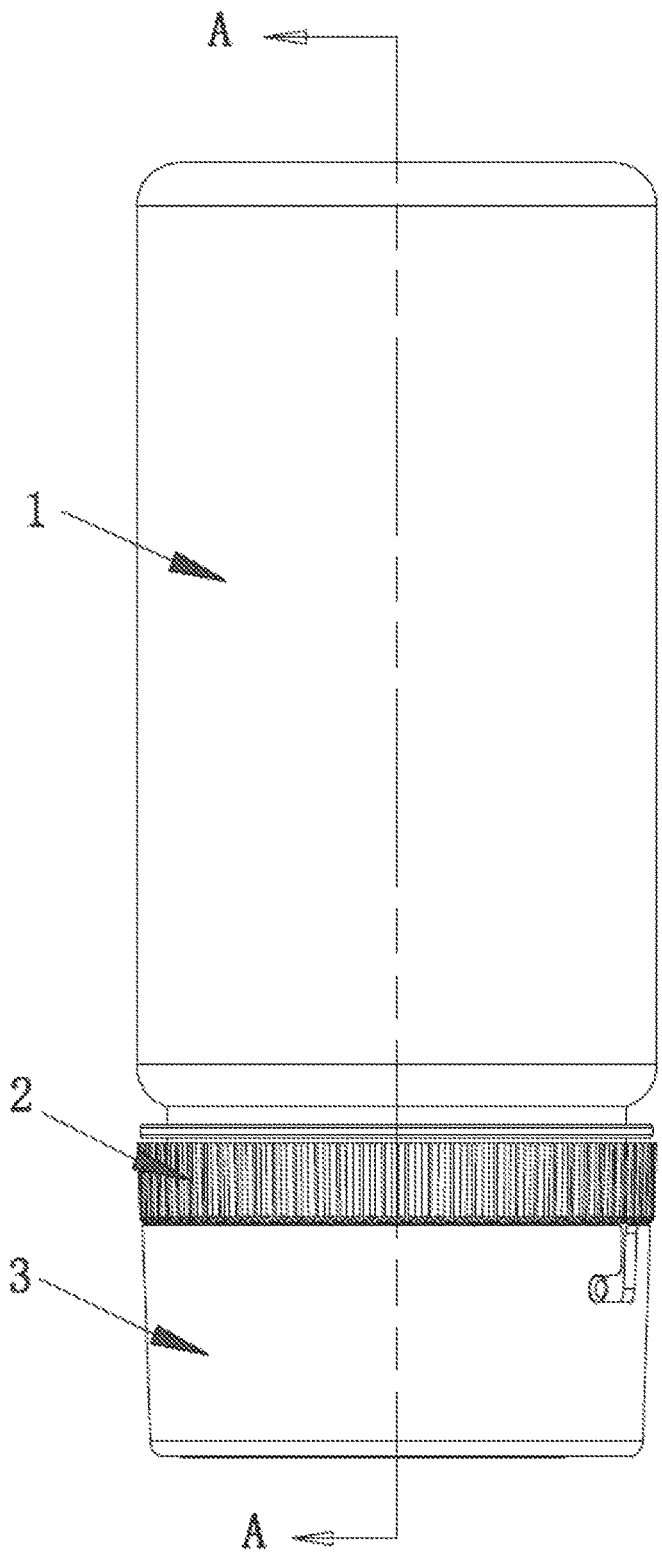
FIG. 1 shows an orthogonal projection front view diagram of the preferred embodiment of the multi-stage rationed feeder for ornamental fish to the invention.
Figure 2:
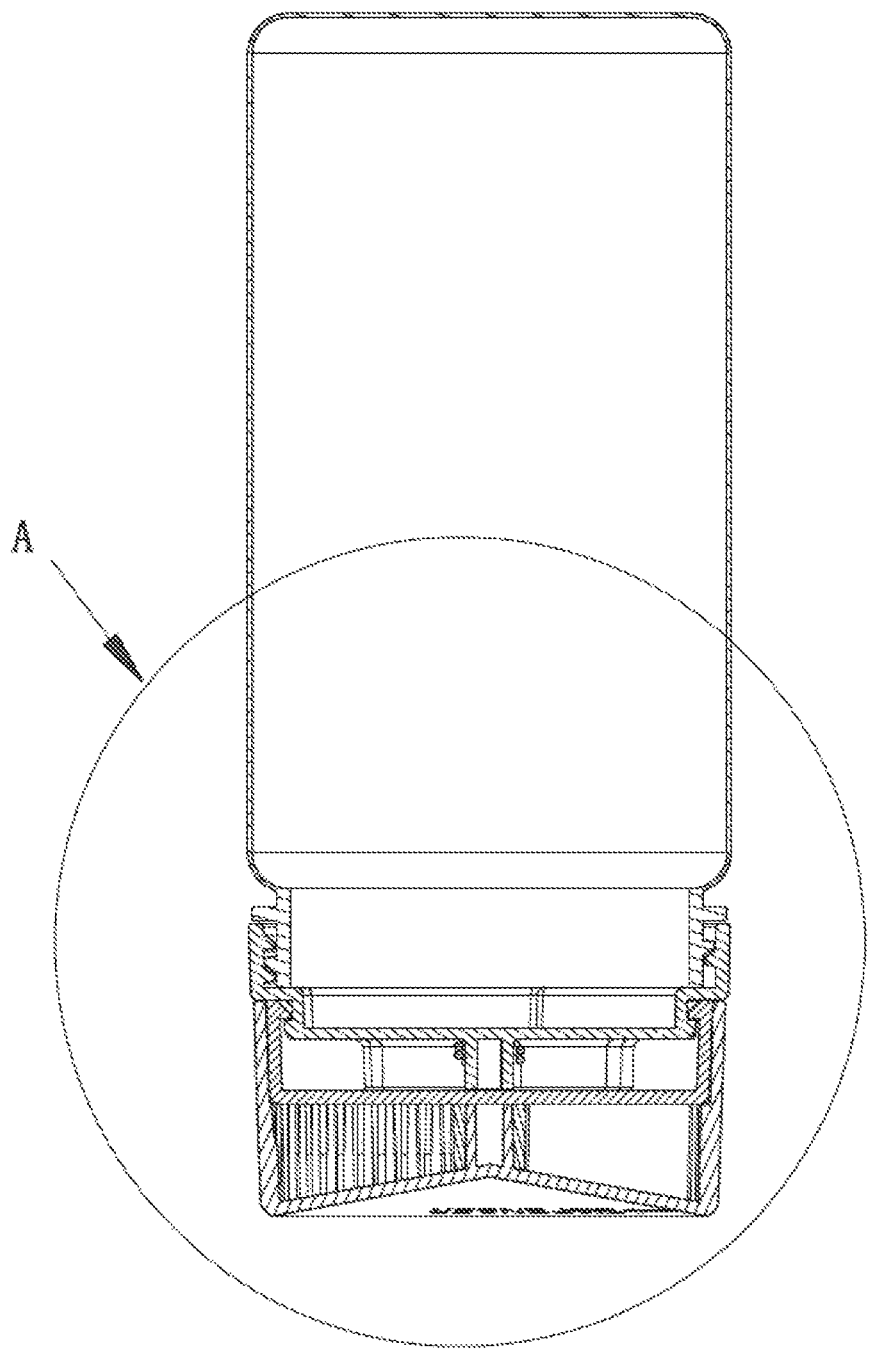
FIG. 2 shows an A-A sectional view of FIG. 1.
Figure 3:
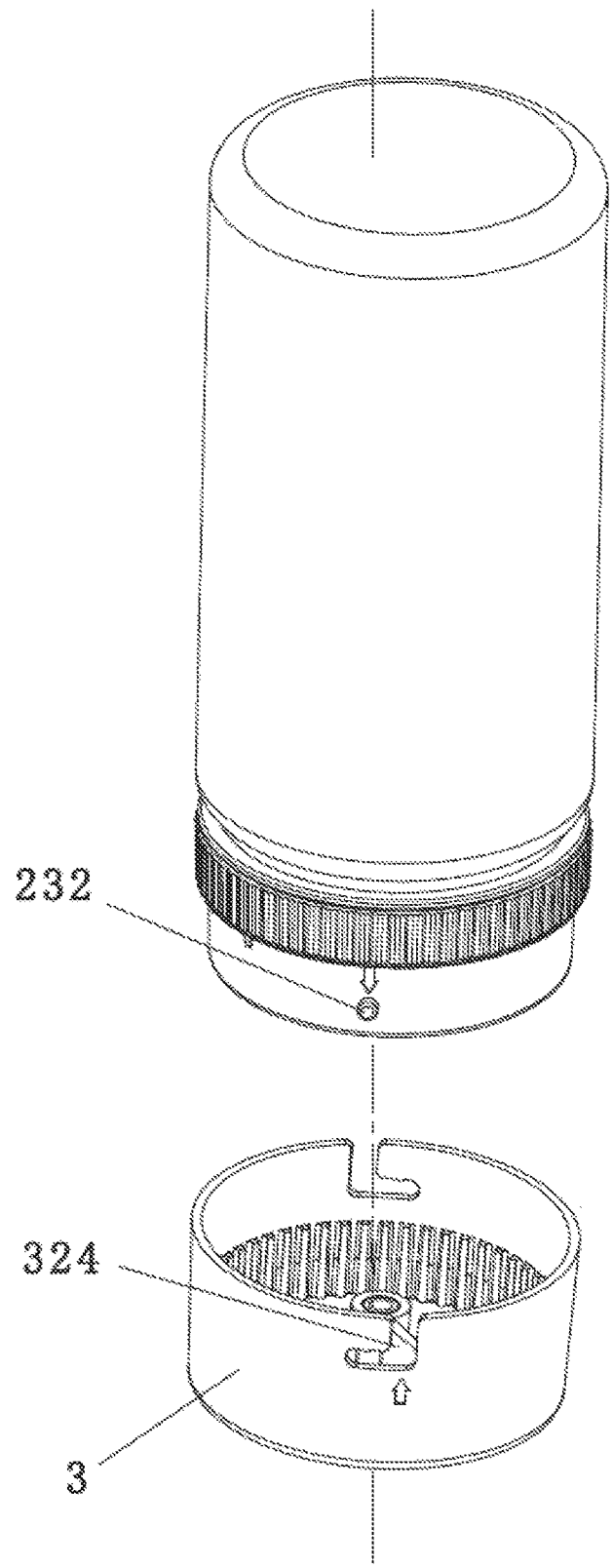
FIG. 3 shows an axonometric projection diagram of the said embodiment after the measuring cup assembly 3 is separated.
Figure 4:
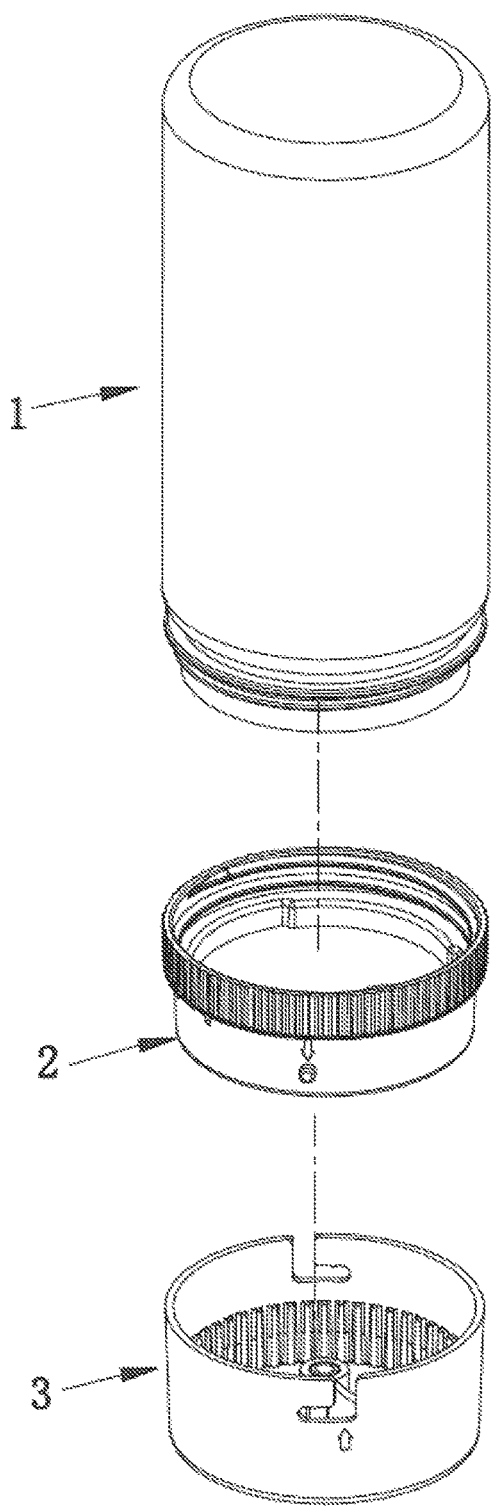
FIG. 4 shows an axonometric projection diagram of FIG. 3 when the container cover assembly 2 is separated as well.
Figure 5:
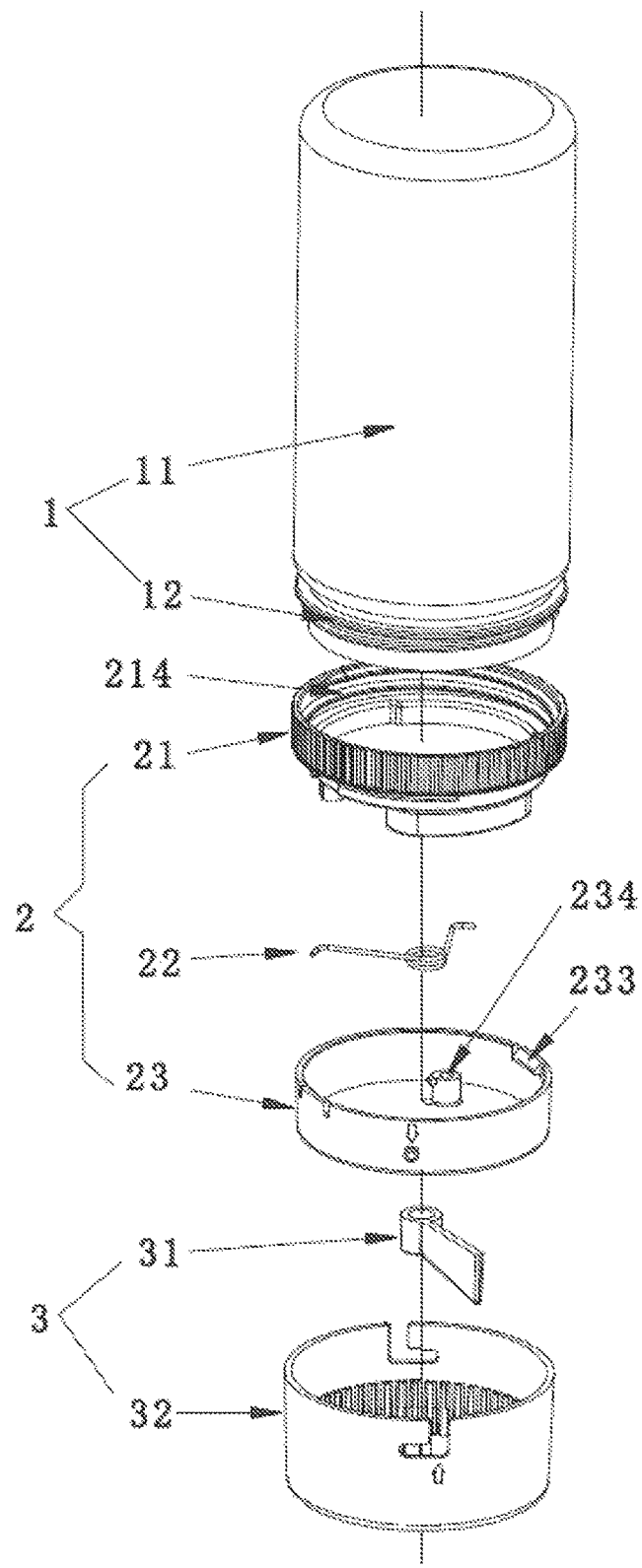
FIG. 5 shows an axonometric projection diagram of the said embodiment after all the spare parts are disassembled.
Figure 6:
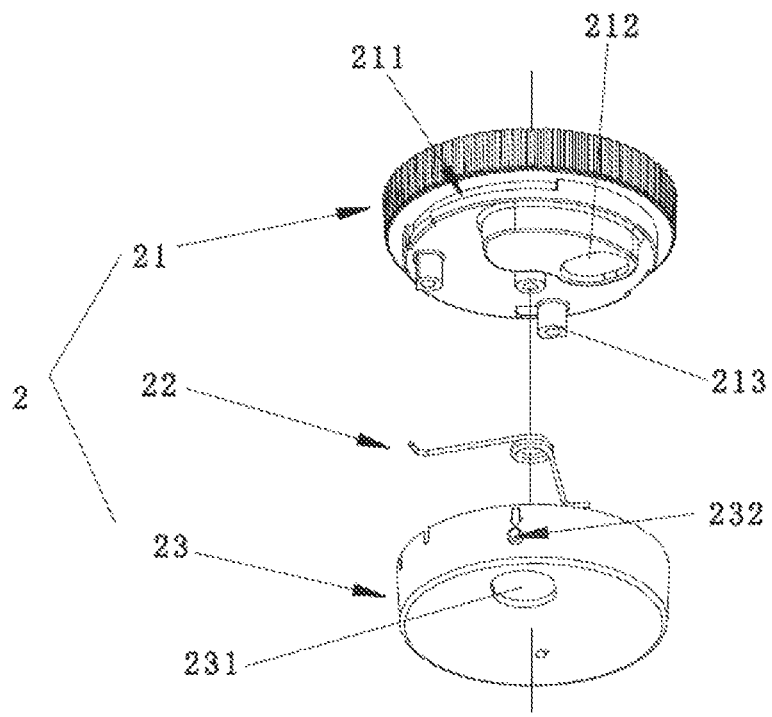
FIG. 6 shows an axonometric projection diagram of the decomposed container cover assembly 2 of the said embodiment.
Figure 7:
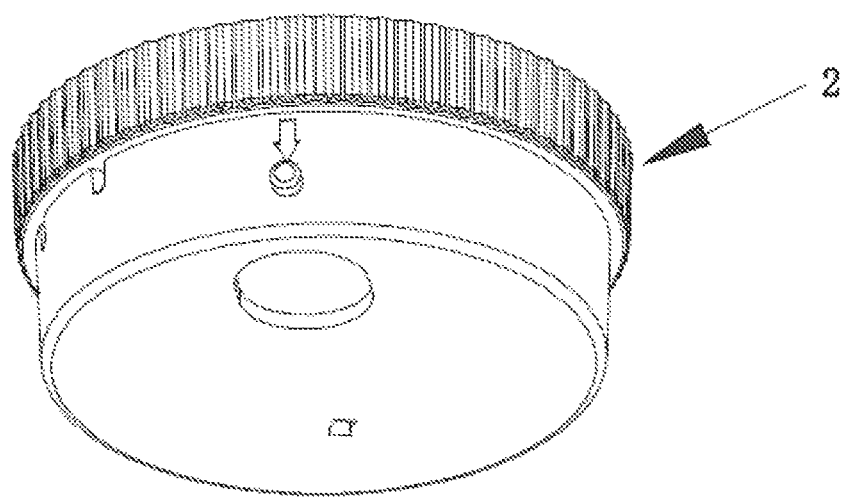
FIG. 7 shows an axonometric projection diagram of the assembled container cover assembly 2 of the said embodiment.
Figure 8:
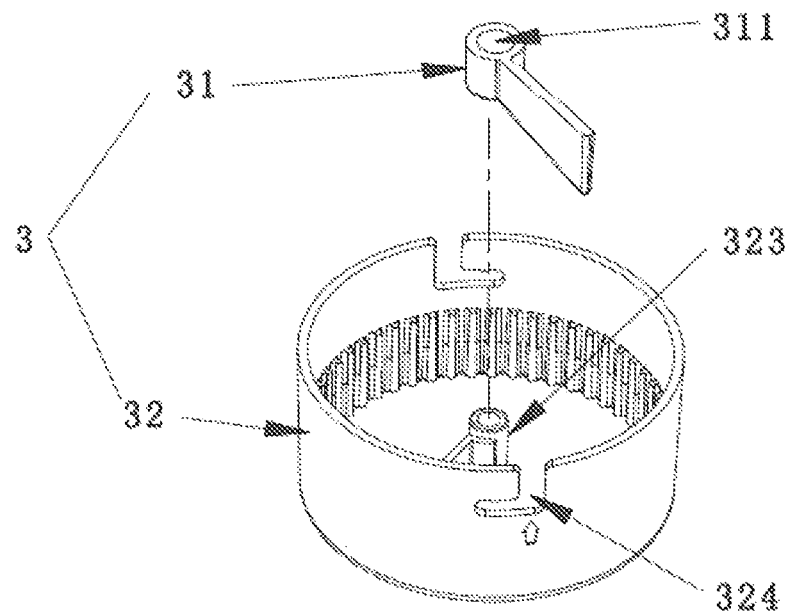
FIG. 8 shows an axonometric projection diagram of the decomposed measuring cup assembly 3 of the said embodiment.
Figure 9:
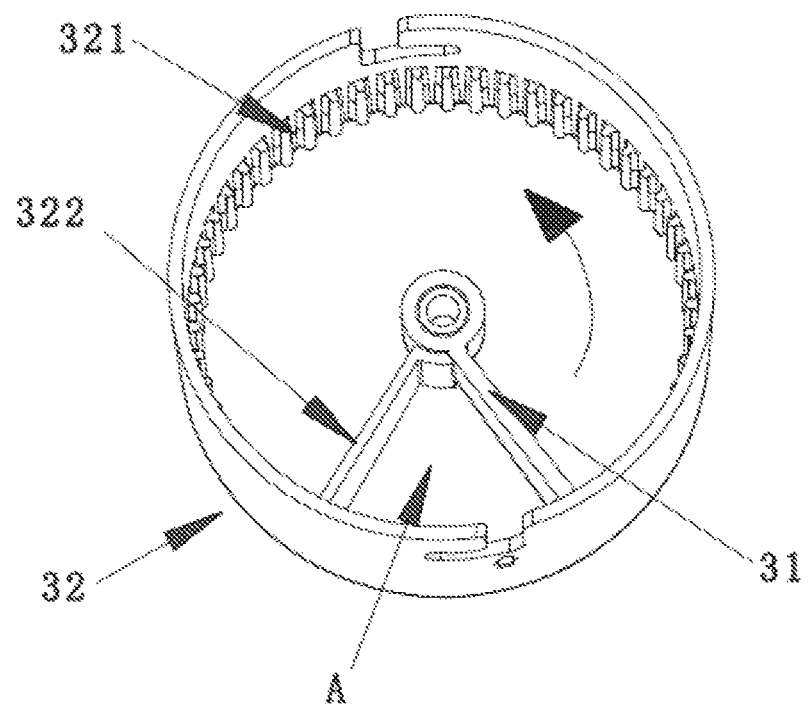
FIG. 9 shows an axonometric projection diagram of the assembled measuring cup assembly 3 of the said embodiment.
Figure 10:
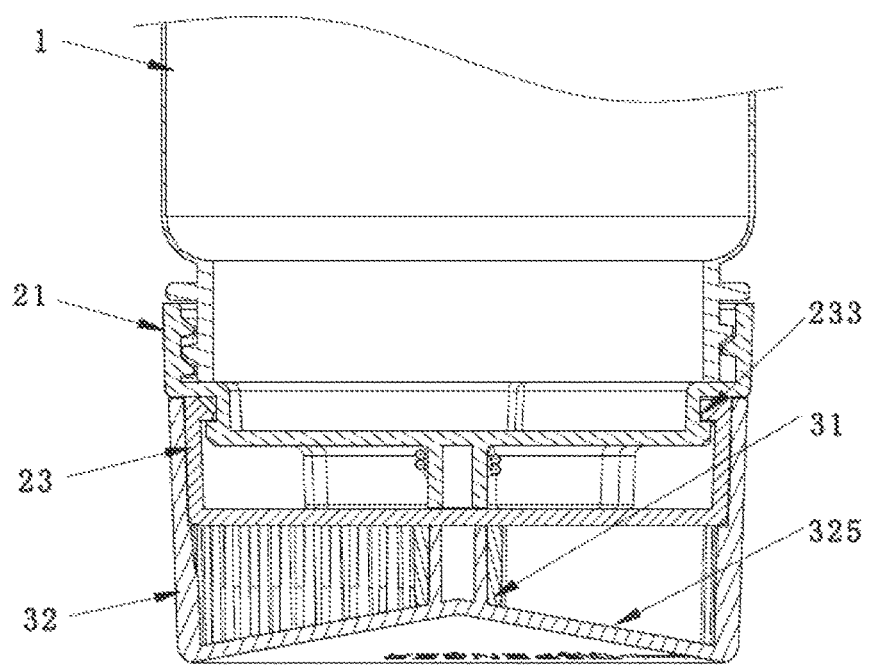
FIG. 10 shows a partial enlarged drawing of Section A in FIG. 2.

In the figures, 1 is a container, 2 is a container cover assembly, 3 is a measuring cup assembly and 4 is the feed;

In the container 1, 11 is an accommodating cavity and 12 is a first connection structure;

In the container cover assembly 2, 21 is a container cover, 211 is a container cover buckle bit slot, 212 is a material discharge hole, 213 are torsional spring clamping posts, 214 is a second connection structure, 22 is a torsional spring, 23 is a falling-material receiving cover, 231 is a falling-material receiving hole, 232 is a falling-material receiving cover pin, 233 is a buckle position, and 234 is a torsional spring sleeve post;

In the measuring cup assembly 3, 31 is blocking slice, 311 is a sleeve hole, 32 is a measuring cup, 321 are tooth slots, 322 is a separating plate, 323 is a blocking slice pin, 324 is a pin groove, 325 is a bottom part of the measuring cup, and A is a quantitative loading zone.

DETAILED EMBODIMENTS

Following, the invention is further described with combination of the figures.

See each figure, the invention has disclosed a multi-stage rationed feeder for ornamental fish, comprising a container 1, a container cover assembly 2 and a measuring cup assembly 3 assembled in order from top to bottom; wherein the container 1 is provided with an accommodating cavity 11 for storing feed, and a first connection structure 12 is provided at a periphery of a mouth of the container 1.

The container cover assembly 2 comprises a container cover 21 and a falling-material receiving cover 23, where in the container cover 21 is provided with a second connection structure 214 at an upper periphery thereof, a material discharge hole 212 at a lower part thereof, and a buckle bit slot 211 at a lower-part outer cylindrical surface thereof, wherein a falling-material receiving hole 231 is provided at a bottom surface of the falling-material receiving cover 23, a falling-material receiving cover pin 232 is provided at the peripheral outside lateral of the falling-material receiving cover 23, and a buckle position 233 is provided at the peripheral internal face of the falling-material receiving cover 23; wherein the falling-material receiving cover 23 is adapted to the container cover 21, and the falling-material receiving cover buckle position 233 is buckled into the container cover buckle bit slot 211, such that the falling-material receiving cover 23 is rotatably mounted and connected to the container cover 21; wherein the second connection structure 214 is adapted to the first connection structure 12, such that the container cover assembly 2 is fixedly connected to the container 1 from below.

The said measuring cup assembly 3 comprises a measuring cup 32 and a blocking slice 31, wherein an axial blocking slice pin 323 is provided at the bottom center of the measuring cup 32, axial tooth slots 321 are provided on the peripheral inner face of the measuring cup 32, a pin groove 324 is provided on the outer edge of the measuring cup 32, and a separating plate 322 is radially arranged with respect to the central axis; where in one end of the blocking slice 31 is provided with a sleeve hole 311 for sheathing the blocking slice pin 323, such that a quantitative loading zone A is formed between the blocking slice 31 and the separating plate 322, wherein the pin groove 324 is adapted to a falling-material receiving cover pin 232, and the falling-material receiving cover pin 232 is clamped into the pin groove 324 such that the measuring cup assembly 3 is removably mounted and connected to the container cover assembly 2 from below.

When the measuring cup assembly 3 is turned to the right to the end, the falling-material receiving cover 23 is driven to turn, thus the falling-material receiving hole 231 is aligned with the material discharge hole 212, and the feed 4 falls into the measuring cup 32. Then, when the measuring cup assembly 3 is turned in the opposite direction to the end, the falling-material receiving cover 23 to is made turn to the falling-material receiving hole 231 and be closed. Then, remove the measuring cup assembly 3, to feed the ornamental fish.

In the embodiment of the invention, the container cover assembly 2 further comprises a torsional spring 22, a lower part of the container cover 21 is further arranged with two axial torsional spring clamping posts 213; a bottom of the falling-material receiving cover 23 can be arranged with an axial torsional spring sleeve post 234; the torsional spring 22 sheathes the torsional spring sleeve post 234 and is clamped between the two torsional spring clamping posts 213, such that while the multi-stage rationed feeder is not feeding food, the azimuth bearing of the falling-material receiving cover 23 is automatically located at where the material discharge hole 212 is closed in the container cover assembly 2.

The first connection structure 12 and the second connection structure 214 are mutually adaptive threaded connection structure.

The upper periphery of the container cover 21 is provided with a second connection structure 214, which is located at the upper periphery inner wall of the container cover 21, while a first connection structure 12 is located at the peripheral outside lateral of the mouth of the container 1.

The outer edge of the measuring cup 32 is arranged with a pin groove 324 shaped like a capital letter L.

The bottom of the measuring cup 32 is inward convex conic shaped, such that the feed is easier to be spread to the surrounding and flow without being blocked, and the ration is accurate.

During the actual operation, the blocking slice 31 can be pulled up and turned as different rations, the end part of the blocking slice 31 can be inserted into different tooth slots 321, so as to get different capacities in the quantitative loading zone A, forming multi-stage rations, the outside surface of the measuring cup 32 can be engraved with capacities corresponding to each tooth slot, so as to operate more conveniently.

Figure 11:
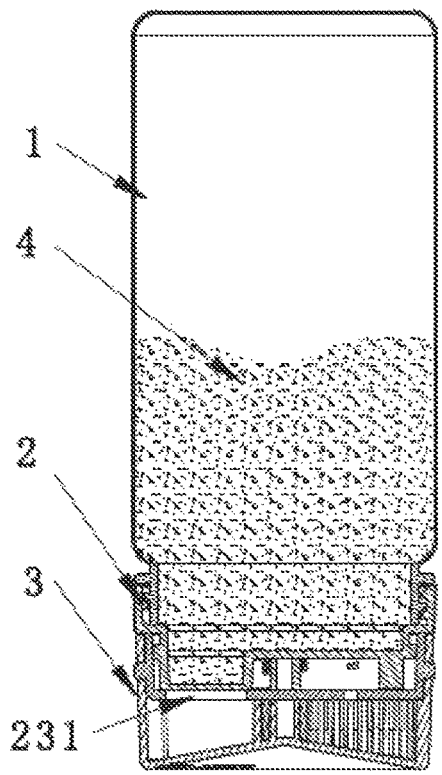
FIG. 11 shows a closed state diagram of the falling-material receiving hole 231 of the said embodiment.

See FIG. 11, under the action of the torsional spring 22, the falling-material receiving hole 231 of the falling-material receiving cover 23 and the material discharge hole 212 of the container cover 21 are mutually staggered, at the falling-material closed status, the feed 4 is locked and unable to fall.

Figure 12:
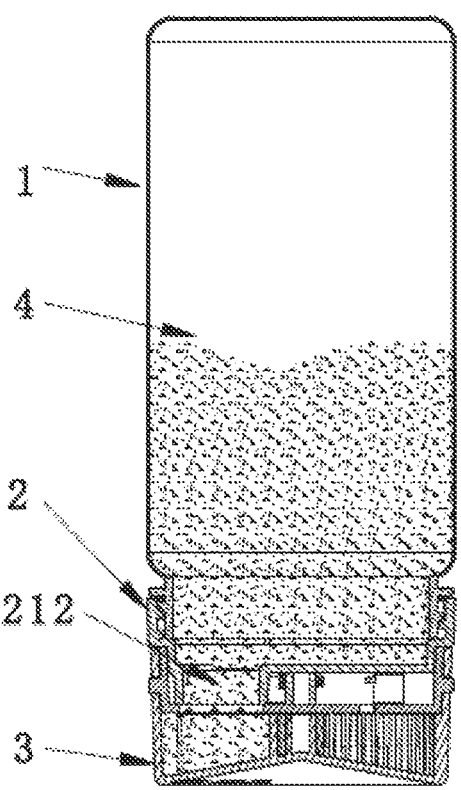
FIG. 12 shows an open state diagram of the falling-material receiving hole 231 of the said embodiment.

See FIG. 12, when the measuring cup 32 is rotated hard, the falling-material receiving cover 23 is driven to rotate, such that the falling-material receiving hole 231 of the falling-material receiving cover 23 is aligned with the material discharging hole 212 of the container cover 212, the falling-material opening status is achieved, and the feed 4 falls into the measuring cup 32. When the measuring cup 32 is loosened, under the action of the torsional spring 22, the falling-material receiving cover 23 drives the measuring cup 32 to restore to the original position, and the falling-material receiving hole 231 is closed. Turn in the opposite direction to remove the measuring cup 32, and it's ready for feeding the ornamental fish.

What is claimed is:

1. A multi-stage rationed feeder for ornamental fish, comprising a container, a container cover assembly and a measuring cup assembly assembled in order from top to bottom, wherein
    the container is provided with an accommodating cavity for storing feed, and a first connection structure is provided at a periphery of a mouth of the container;
    the container cover assembly comprises a container cover and a falling-material receiving cover, wherein the container cover is provided with a second connection structure at an upper part periphery thereof, a material discharge hole at a lower part thereof, and a buckle bit slot at a lower-part outer cylindrical surface thereof, wherein a falling-material receiving hole is provided at a bottom surface of the falling-material receiving cover, a falling-material receiving cover pin is provided at the peripheral outside lateral of the falling-material receiving cover, and a buckle position is provided at the peripheral internal face of the falling-material receiving cover; wherein the falling-material receiving cover is adapted to the container cover, and the falling-material receiving cover buckle position is buckled into the container cover buckle bit slot, such that the falling-material receiving cover is rotatably mounted and connected to the container cover; wherein the second connection structure is adapted to the first connection structure, such that the container cover assembly is fixedly connected to the container from below;
    the measuring cup assembly comprises a measuring cup and a blocking slice, wherein an axial blocking slice pin is provided at the bottom center of the measuring cup, axial tooth slots are provided on the peripheral inner face of the measuring cup, a pin groove is provided on the outer edge of the measuring cup, and a separating plate is radially arranged with respect to the central axis; wherein one end of the blocking slice is provided with a sleeve hole for sheathing the blocking slice pin for the blocking slice, such that a quantitative loading zone is formed between the blocking slice and the separating plate; wherein the pin groove is adapted to a falling-material receiving cover pin, and the falling-material receiving cover pin is snapped into the pin groove such that the measuring cup assembly is removably mounted and connected to the container cover assembly from below.

2. The multi-stage rationed feeder for ornamental fish according to claim 1, wherein,
    the container cover assembly further comprises a torsional spring;
    a lower part of the container cover is further arranged with two axial torsional spring clamping posts;
    a bottom of the falling-material receiving cover is arranged with an axial torsional spring sleeve post;
    the torsional spring sheathes the torsional spring sleeve post and is clamped between the two torsional spring clamping posts such that while the multi-stage rationed feeder is not feeding food, the azimuth bearing of the falling-material receiving cover is automatically located at where the material discharge hole is closed in the container cover assembly.

3. The multi-stage rationed feeder for ornamental fish according to claim 1, wherein the first connection structure and the second connection structure are mutually adaptive threaded connection structures.

4. The multi-stage rationed feeder for ornamental fish according to claim 1, wherein the upper periphery of the container cover is provided with a second connection structure, which is located at the upper periphery inner wall of the container cover, while a first connection structure is located at the peripheral outside lateral of the mouth of the container.

5. The multi-stage rationed feeder for ornamental fish according to claim 1, wherein the outer edge of the measuring cup is arranged with a pin groove shaped like a capital letter L.

6. The multi-stage rationed feeder for ornamental fish according to claim 1, wherein the bottom of the measuring cup is inward convex conic shaped.

\* \* \* \* \*